United States Patent [19]

Krishna et al.

[11] Patent Number: 6,055,522
[45] Date of Patent: Apr. 25, 2000

[54] AUTOMATIC PAGE CONVERTER FOR DYNAMIC CONTENT DISTRIBUTED PUBLISHING SYSTEM

[75] Inventors: B. C. Krishna, Chelmsford; Julie Melbin; Daniel E. Latham, both of Concord, all of Mass.

[73] Assignee: FutureTense, Inc., Acton, Mass.

[21] Appl. No.: 08/879,013

[22] Filed: Jun. 19, 1997

Related U.S. Application Data

[63] Continuation-in-part of application No. 08/790,654, Jan. 29, 1997, which is a continuation-in-part of application No. 08/593,653, Jan. 29, 1996, abandoned.

[51] Int. Cl.[7] .................................................. G06F 17/00
[52] U.S. Cl. ................................................................ 705/517
[58] Field of Search .................................... 707/517, 523, 707/515, 530, 513, 526, 529; 709/200–203, 217, 219; 395/701, 712, 500, 710

[56] References Cited

U.S. PATENT DOCUMENTS

| | | | |
|---|---|---|---|
| 5,355,472 | 10/1994 | Lewis ....................................... | 395/600 |
| 5,434,961 | 7/1995 | Horiuchi et al. ........................ | 395/144 |
| 5,524,201 | 6/1996 | Shwarts et al. .......................... | 395/161 |
| 5,530,852 | 6/1996 | Meske, Jr. et al. ...................... | 395/600 |
| 5,546,517 | 8/1996 | Marks et al. ............................. | 395/145 |
| 5,557,722 | 9/1996 | DeRose et al. .......................... | 395/148 |
| 5,572,643 | 11/1996 | Judson ..................................... | 395/793 |
| 5,623,656 | 4/1997 | Lyons ....................................... | 395/610 |
| 5,860,073 | 1/1999 | Ferrel et al. ............................. | 707/522 |

OTHER PUBLICATIONS

"TrueDoc Font Technology Overview for New Media," Bitstream Inc. (May 1996).

Mitchell, J., "Font Fidelity in Portable Documents," *Color Publishing* (Jan./Feb. 1995).

"OPI: Open Prepress Interface Specification 1.3" (Sep. 22, 1993).

*Primary Examiner*—Joseph H. Feild
*Assistant Examiner*—Alford W. Kindred
*Attorney, Agent, or Firm*—Hamilton, Brook, Smith & Reynolds, P.C.

[57] ABSTRACT

A Page Builder software program that operates in connection with a dynamic content publishing program such as FutureTense Designer™. The Page Builder program accepts a dynamic content publication file as input and generates one or more hypertext markup language (HTML) pages for each navigable state of the dynamic content file. As a result, the dynamically specified content is encapsulated in a set of Web pages that may be displayed by a browser which does not have a viewer program applet or plug-in. This provides a capability for producing dynamic content publications such as Web pages while eliminating the need to download specialized Viewer applets or otherwise to make use of modified or programming-enabled browser programs.

14 Claims, 8 Drawing Sheets

AUTOMATIC PAGE CONVERTER FOR DYNAMIC CONTENT DISTRIBUTED PUBLISHING SYSTEM

CROSS REFERENCE TO RELATED APPLICATION

This application is a continuation-in-part of a co-pending U.S. patent application Ser. No. 08/790,654 filed Jan. 29, 1997 entitled "Distributed Electronic Publishing System", which is a continuation-in-part of U.S. patent application Ser. No. 08/593,653, abandoned, filed Jan. 29, 1996 entitled "Distributed Electronic Publishing System".

BACKGROUND

In a distributed computing environment, certain computers, known as servers, are used primarily to store and supply information. Other computers in the network, known as clients, allow a user to download replicas of the information from the servers.

One of these environments, known as the World Wide Web (or simply, "the Web") is a system for delivering hypertext information across the Internet. Within the Web, a particular type of server, known as a Web server, provides access to information stored in a format known as a Web page. A Web page is a data structure containing a repository of different types of information, and may include text, images, sounds, animations, three dimensional simulations and/or address pointers to other servers where such information can be found. The computer programs that execute on the client computers to interpret and display Web pages are typically referred to as browsers.

Historically, publishers have used a text mark-up language to specify the format of Web pages, the most common example being the well-known Hypertext Markup Language (HTML). A given HTML file may contain a number of items such as graphics, tables, buttons, and other elements to be displayed on the screen, and may also reference other Web pages or portions of Web pages via Universal Resource Locators (URLs). Accordingly, in order to alter the contents or appearance of a Web page, the HTML file itself must be changed. The creation and updating of Web pages can become very expensive, especially where publishers typically must employ professional designers and programmers in order to produce high quality Web pages. This process is becoming increasingly complex with the advent of programming languages that permit a publisher to embed a program within a Web page that specifies certain actions to be taken by the browser at the time the page is displayed.

Fortunately, certain tools have been developed that permit publishers to manage this process effectively. One such tool is a dynamic content authoring tool which is the subject matter of the above referenced co-pending patent application by Krishna, B. C., et al. entitled "Distributed Electronic Publishing System", Ser. No. 08/790,654 filed Jan. 29, 1997, and assigned to FutureTense, Inc., of Acton, Mass., the assignee of the present invention, which is hereby incorporated by reference.

The dynamic content publishing tool described in the patent application is available as a software program called FutureTense™ Designer (FutureTense is a trademark from FutureTense, Inc. of Acton, Mass.). FutureTense Designer permits the publisher to first create a template file. The template file specifies how a Web page is to be displayed even if the content is not completely known at the time that the Web page is designed. In particular, the template file consists of a set of objects defined not only by the object content but also by the actions taken on or by such objects. Object content can be defined by storing the formatted content itself, as well as by reference to a location where the content file can be found. In this manner, a Web page author may design the page by establishing a viewing region on the page, providing instructions for obtaining and formatting objects to be displayed in each region, and prescribing a set of actions by which the objects interact with one another.

At the client side, when a user requests access to a Web page which was created by the FutureTense Designer program, the browser program first accesses and runs a program for interpreting the template called FutureTense Viewer. The Viewer program may be implemented in the browser as an applet or plug-in written in Java, C++ or a similar software language. The Viewer program is then activated to locate and interpret the object content and actions contained in the template file. As a result, the Viewer program then causes information to be displayed within each region of the screen in accordance with the instructions in the template file. The Viewer program also executes any actions between objects as required.

The advantage of using such a template tool is that the publisher does not need to know, at the time of designing the page, the exact nature of or the amount of information to be displayed. Specifically, through calls to information sources, the template can be filled automatically with current information, with much reduced human overhead for page-by-page revision and updating.

Furthermore, a set of actions and/or triggers for each action, such as buttons, mouse clicks, scroll down or scroll up controls, timers, etc. may be used to control how information may be displayed in an interactive manner. Also, from a publishing perspective, layout and typography can be controlled at the client by having the content file specify fonts or other text attributes separately from the information itself.

However, this approach to publishing Web pages presently poses certain client-side requirements. In particular, older versions of browsers, such as those that run under the Windows 3.1 operating system, do not provide support for browser-embedded programming languages such as Java or ActiveX. Furthermore, even if a user does have a Viewer-capable browser such as those running under Windows 95, Windows NT, or the Macintosh, such users may not wish to have Viewer programs installed or downloaded to their computer that modify the behavior of their browsers.

Thus, there is a need to provide a way for publishers to view the production of Web pages as a dynamic content process, while at the same time permitting users of browsers located at the client computers to have such dynamic content functionality delivered to them without requiring embedded Viewer programs.

SUMMARY OF THE INVENTION

Briefly, the invention is a Page Builder program that operates on a document template file to automatically produce a visual representation, or snapshot, of each possible object and each navigable state of the template file. A set of links is also produced which specify how transitions between such representations should occur.

More specifically, the template file consists of a specification for a Web page in terms of object content and actions to be taken on or between such objects. The objects and actions define a set of navigable states for the visual page.

The object content can be specified in terms of the type of content, such as text or graphic image, and its formatting attributes, such as position on the page, typography, graphic resolution, and so forth. The content may actually be imbedded in the template file or may simply be a reference to where the content can be found, such as via a Universal Resource Locator (URL).

The template file also includes a set of actions to be taken on or between the objects in response to user inputs or triggers. User inputs may include items such as mouse click, and events may include items such as timers.

In operation, the Page Builder program interprets the template file to produce one or more visual representation for each navigable state of the template file. The visual representation may typically be rendered as one or more Hypertext Markup Language (HTML) pages for each navigable state of the template file. Depending upon the type of objects specified, multiple objects may be rendered on a single HTML page.

The Page Builder program also automatically generates a set of transition actions between the visual representations, depending on the actions specified by the template.

The template file may be converted by the Page Builder on demand, or may be run at scheduled intervals at the server.

At the time of conversion, the content is fetched as required from local or remote servers, and fonts are located for rendering text. Image and graphic objects are rendered as visual images. Text objects may either be rendered as text or as graphic images with specific font selections depending upon developer choice.

As a result, dynamically specified content in the template file such as interactive behavior, page layout, and/or typography are encapsulated in a set of Web pages that may be displayed without the need to install a Viewer program in the browser. The resulting set of Web pages is created in such a way as to recreate the original behavior of the template as closely as possible.

When the content is text, the set of HTML files created can preserve proper text fonts and other text attributes. The Page Builder program does this by converting the text objects into image files with the correct fonts and formatting. Large amounts of text may therefore result in the creation of many Web pages, wherein each page displays an image that represents one of the possible scrolled states of the text. Hypertext links are then typically created by the Page Builder so that a browser program can navigate between them. In addition, graphic user controls such as scroll bars, next page buttons, or the like may be added to permit the user to navigate the resulting set of visual pages.

In addition, objects that are associated with user actions are typically converted to Graphic Image File (GIF) format. This permits the display of, for example, a navigational image map such that by clicking on the image map the user may navigate to a new page. The image may thus cause the browser to navigate to the correct page.

The Page Builder program may also treat certain other non-text objects on a page as remaining unchanged across the generated pages. For example, if a template contains a scroll action on two different text objects, the resulting pages generated by the Page Builder may show one of the objects in its scrolled-through state while the other object remains in its initial state. The result is that the same look and feel is delivered to the user of an HTML-only browser as if the user had a template Viewer program enabled browser.

BRIEF DESCRIPTION OF THE DRAWINGS

The above and further features of the invention include various novel details of construction and combination of components. These novel features will now be more particularly pointed out in the following claims, and their advantages will also become evident as they are described in detail with reference to the accompanying drawings, in which:

DETAILED DESCRIPTION OF A PREFERRED EMBODIMENT

Figure 1:
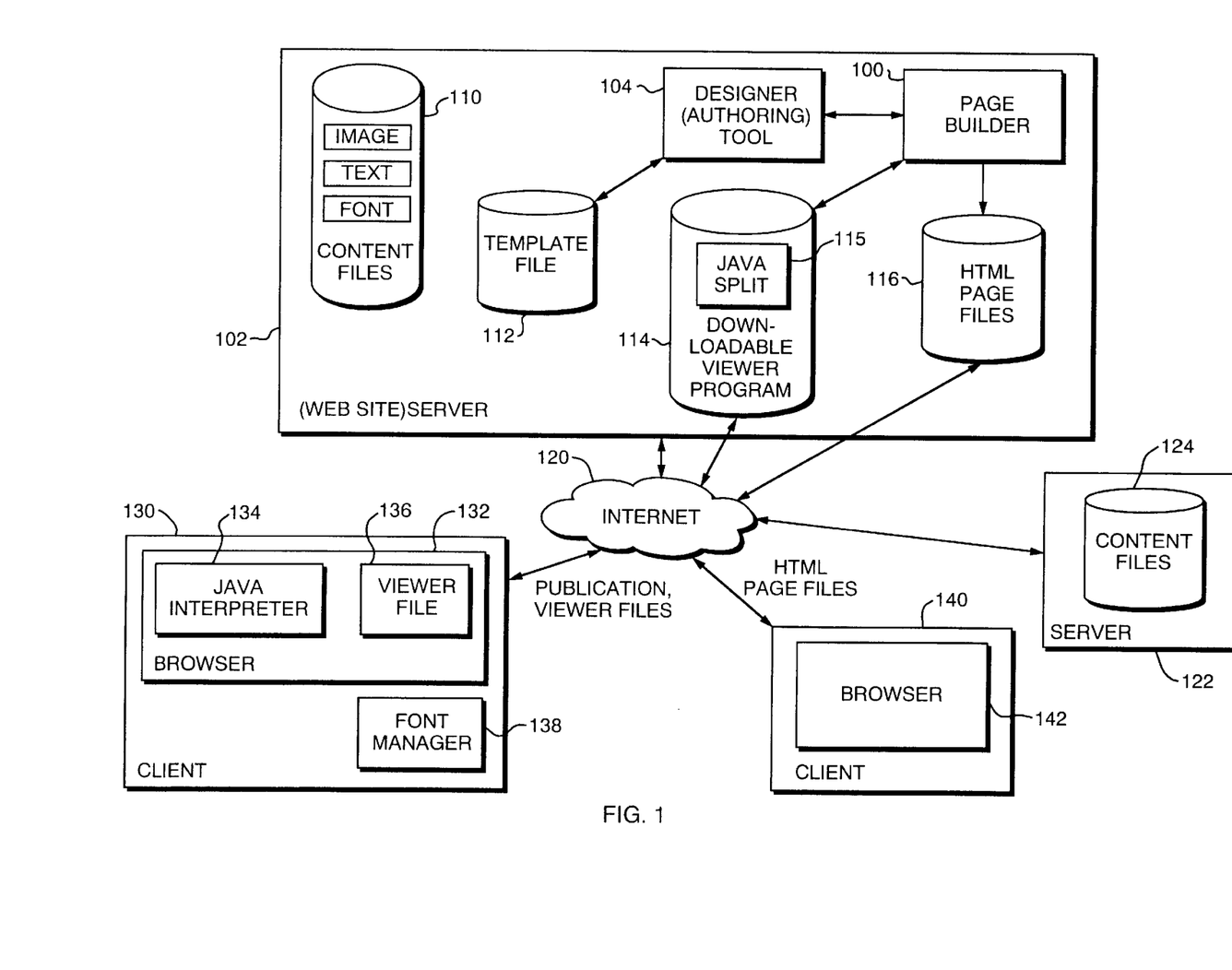
FIG. 1 is a pictorial representation of a computer network that makes use of a Page Builder program according to the invention.

Turning attention now to the drawings, FIG. 1 illustrates an electronic publishing system that makes use of a Page Builder software program 100 according to the invention. The Page Builder 100 typically runs within the context of a Web site or server computer 102. The server 102 has stored therein a number of different computer files including content files 110, template files 112, downloadable dynamic content Viewer file 114, and a number of Hypertext Markup Language (HTML) page files 116 that are generated by the Page Builder program 100 in a manner as follows.

In particular, in a manner which is well known in the art, the server computer 102 communicates with other computers over a network such as the Internet 120. These other computers may include servers such as server 122 having content files 124 stored therein or client computers 130 and 140.

The client computer 130 has a browser program 132 that includes a programming language interpreter such as a Java interpreter 134 contained within. The browser program 132, may for example, be Netscape Navigator Version 3.0 or Microsoft Internet Explorer Version 3.0 running within the Windows 95 operating system. The browser 132 also includes programs such as a FutureTense™ Viewer program 136 compatible with a FutureTense™ Designer program 104. The FutureTense Designer and FutureTense Viewer are software programs available from FutureTense, Inc. of Acton, Mass. A font manager 138 may also be installed in the client computer 130.

In contrast, the client computer 140 contains a browser 142 that does not have a Viewer program 136 running therein. The browser 142 on the client computer 140 may thus be an older version of a browser such as Netscape Navigator 2.0 or Microsoft Internet Explorer Version 2.0 running on the Windows 3.1 operating system which does not the capability of running a Java interpreter. However, the browser 142 may actually be a Java-enabled browser such as browser 132 in which case the user of computer 140 has determined that he or she does not wish a Viewer program 136 to be installed therein.

Returning attention now to the server 102, the author of a Web page uses the Designer tool 104 to produce Web pages having dynamic content in a manner described in more detail in the referenced co-pending patent application. Suffice it to say here that the author uses the Designer tool 104 to define a Web page typically in the form of a number of regions. The author specifies a set of instructions for obtaining and formatting content objects to be displayed in each region, as well as actions to be taken on or by such objects. These object and action definitions are then placed in a template file 112. It should be understood that the content portion of a template file 112 may actually be a reference to objects that may be stored on a server 122 that is located remotely to the Web server 102 on which the template file 112 is stored.

The server 102 also has stored therein a downloadable Viewer file 114 which typically contains an applet or plug-in portion 115 that contains programs which are used by the browser 132 to interpret the template file 112.

When a user, such as a user located at the Viewer-enabled client system 130, wishes to view a template file 112, the client 130 first makes a request to the server 102. The server 102 then downloads the template file 112 to the browser 132. In addition, the Viewer program 114 is also downloaded to the client computer 130 if a Viewer 136 is not already stored therein. In either event, the browser 132 then ascertains that the downloaded template file 112 requires the applet 115, and uses the applet 115 in conjunction with the local Java interpreter 134 to display the Web page. The Viewer 136 will typically use URLs contained within the template file 112 to obtain the content and action information from servers 102 and/or 122. The content and action to information in the template file 112 are then used to change the visual display of the page in response to the user inputs.

However, in accordance with the present invention, the Page Builder program 100 can be used by the developer to allow non-Viewer-enabled browsers 142 to display the behavior specified by the template files 112. For example, since the browser 142 cannot or does not wish to run the Viewer program 114 to view the template file 112, the Page Builder program 100 is first run. The Page Builder 100 accepts the template file 112 and content files 110 and/or 124 as inputs. The Page Builder 100 then proceeds to generate a set of HTML page files 116 that capture all possible visual states specified by the template file 112. The Page Builder 100 also incorporates therein a set of transition actions between the visual representations, depending upon the actions specified in the template 112. This eliminates the need for the Viewer file 115 to be downloaded to the client 140.

Figure 2:
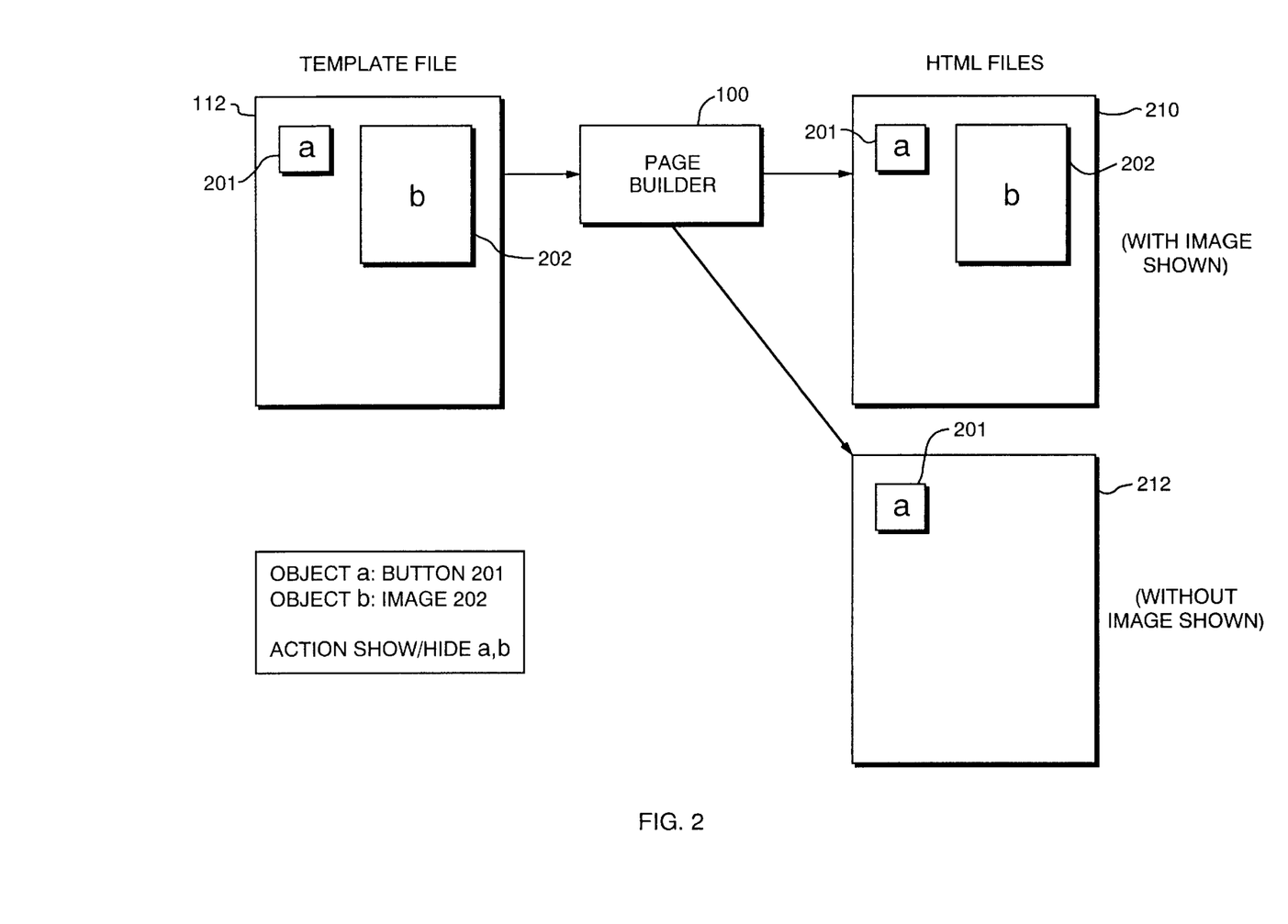
FIG. 2 is an example of how the Page Builder converts a template file to produce a number of visual representations such as in the form of Hypertext Markup Language, (HTML)

FIG. 2 shows one example of the operation of the Page Builder 100 more particularly. A template file 112 specifies two graphic objects including a button 201 and a graphic text object 202. The actual content description needed to produce a visual representation of the button 201 and graphic text object 202 may be specified by URLs that point to remotely located content files 110 or 124. The template file 112 also specifies an action relationship between the objects 201 and 202; namely, that the object 201 is used as a button to alternately show or hide the image represented by graphic 202.

In accordance with the invention, the template file 112 is input to the Page Builder program 100 which in turn generates an HTML file for each of the possible display states specified by the template file 112. In this example, two HTML page files 210 and 212 are generated. The initial page file 210 created reflects the initial state of the template 112 as would be displayed in the Viewer-enabled browser 142. Here, the initial page file 210 is the HTML representation of the button 201 plus the graphical object 202.

The second page file 212 created illustrates the state the user would see after the user specified action, that is, after the user clicks the trigger represented by the button 201. In addition, a hyperlink is also associated with the button 201 in each HTML file to display the other HTML file.

As a result, the Page Builder 100 has generated a set of HTML files 210, 212 which represent each of the possible visual states as if the template file 112 had been presented to the Viewer program 132. Those HTML files 210, 212 may be viewed by a browser 142 which is not viewer-enabled and/or does not have a Viewer program 136 installed therein.

Figure 3:
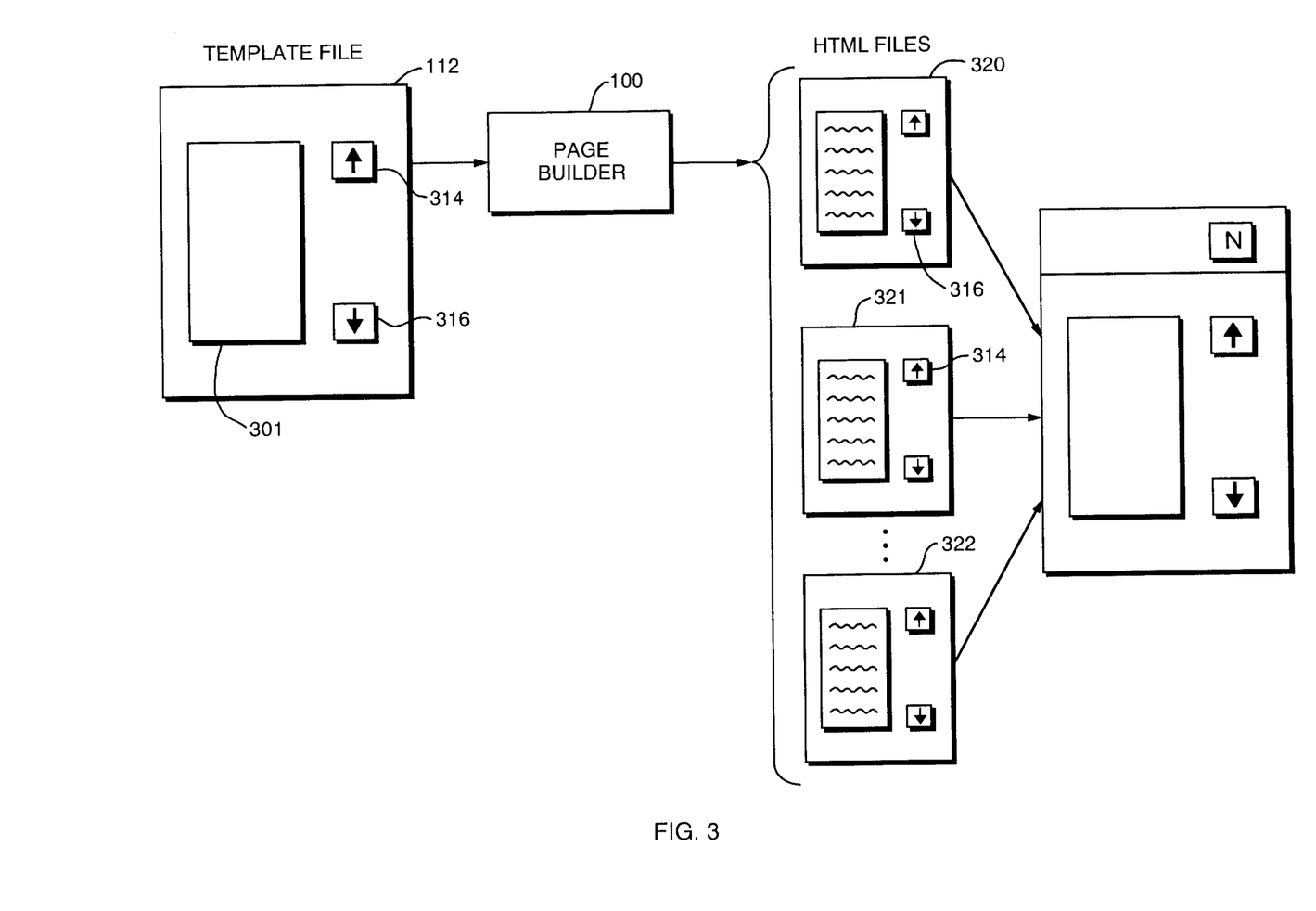
FIG. 3 illustrates how a template file having a text section is converted by the Page Builder into a set of HTML files with navigation triggers.

FIG. 3 is another illustration showing how text content is handled by the Page Builder 100. In this example, the template file 112 may contain a region, such as region 301, in which a large amount of text is to be displayed. There may also typically be, for example, regions 314 and 316 defined in the template 112 which are scroll button triggers that cause the text in the region 301 to be scrolled up or scrolled down, respectively.

In this example, the Page Builder 100 generates a number of HTML files 320, 321, . . . , 322 that represent each possible visual state of the template file 312. In particular, an HTML file 320 is created that reflects each possible state of the template file 112 if viewed by the Viewer-enabled browser 132.

The generated HTML files 320, 321, . . . , 322 may contain graphic image format (GIF) type files of the text complete with the desired fonts and hyphenation that might be available when the dynamic content file 113 is viewed by the Viewer enabled browser 132.

In addition, the Page Builder 100 automatically creates links between the generated HTML page files 320, 321, . . . , 322 such as a graphic of a scroll down button 316 which is a hypertext link to the next HTML page file in this series of HTML page files 320, 321, . . . , 322. A scroll up button 314 on the second generated HTML page file 321 may typically contain a hypertext link to the first HTML page file 320.

In this manner, a non-Viewer-enabled browser may experience the visual effect, including not only the proper font and hyphenation and other text attributes, displayed as desired by the developer, but also may have the actions associated with the objects properly.

Figure 4:
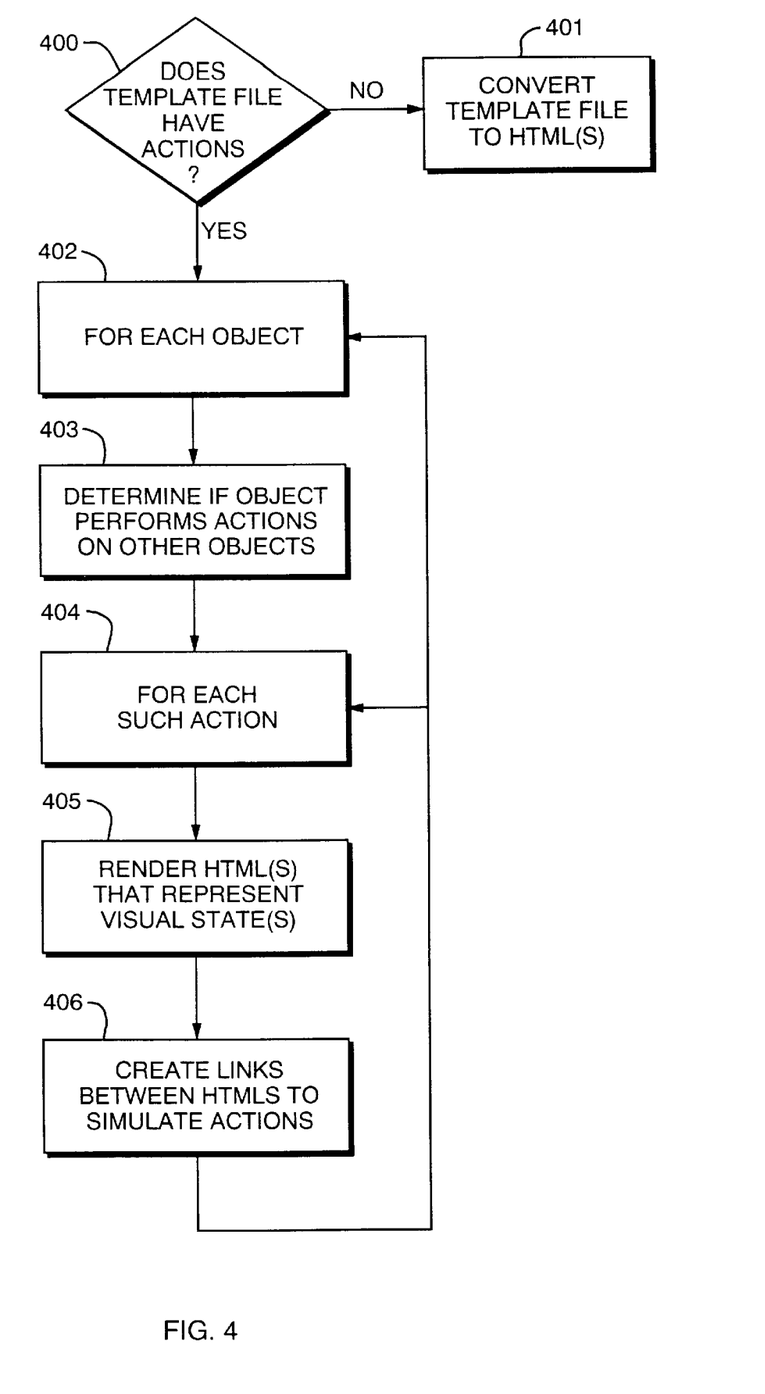
FIG. 4 is a software flow diagram for a process performed by the Page Builder program to convert a template file.

FIG. 4 shows a set of operations performed by the Page Builder 100 to create the HTML pages 320. The set of operations may be performed at the time that a user of the non-Viewer enabled browser 142 requests access to the template 112 file or may be carried out in anticipation of such requests at scheduled intervals, or at least each time the specification of the template 112 or content files 110 or 124 changes.

In a first step 400 the Page Builder 100 determines whether the template file 112 contains actions which allow the user to change the resulting state of the display these include objects in the template file 112 such as buttons, scroll bars, or other indications of the need to create multiple states of the visual end result. If the answer is no, then processing proceeds to step 401 where the template file 112 is typically converted to one or more HTML files as described in connection with FIGS. 2 and 3.

If however, the template file 112 does contain objects that interact with one another, then step 402 is executed. For each such object in step 402, and for each possible state of such actions in step 404, then step 405 is entered in which the template file 112 is rendered as one or more HTML page files 116 for the given state.

In the next step 406, any required hyperlinks are created to other HTML files 116 as needed to permit the user of the non-Viewer enabled browser to navigate properly between the visual states.

It should also be understood that if in step 405 it was necessary to create more than one HTML file 116 to represent a particular state of the template 112, then multiple links to multiple HTML files 116 are created in step 406.

After step 406, processing returns to traverse steps 402, 403, 404, 405 and 406 a sufficient number of times to process all possible states represented by the template file 112 for each action and for each possible state of each action.

Figure 5A:
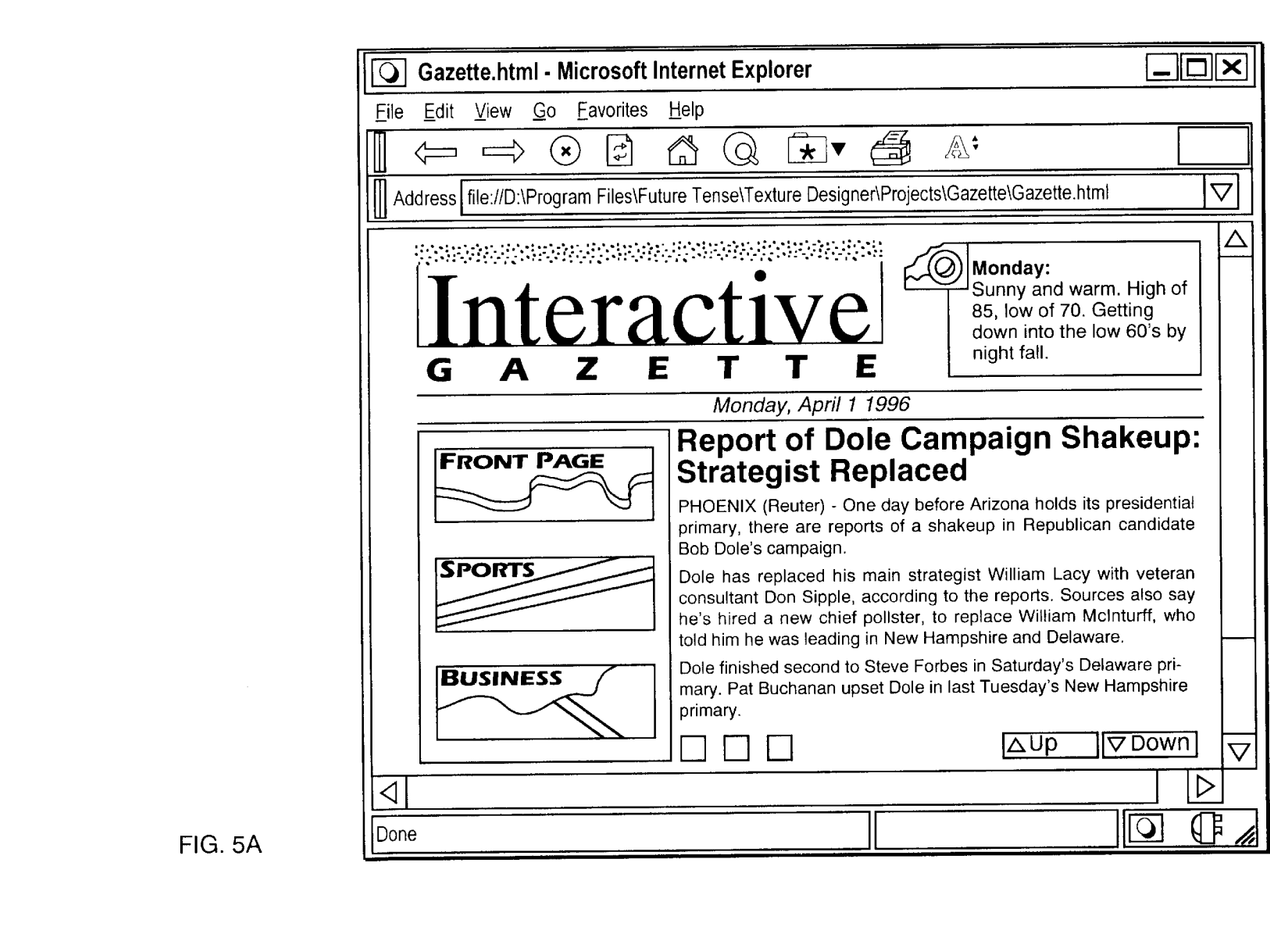
FIGS. 5A through 5D depict results of the Page Builder operating on text objects in various ways.
Figure 5B:
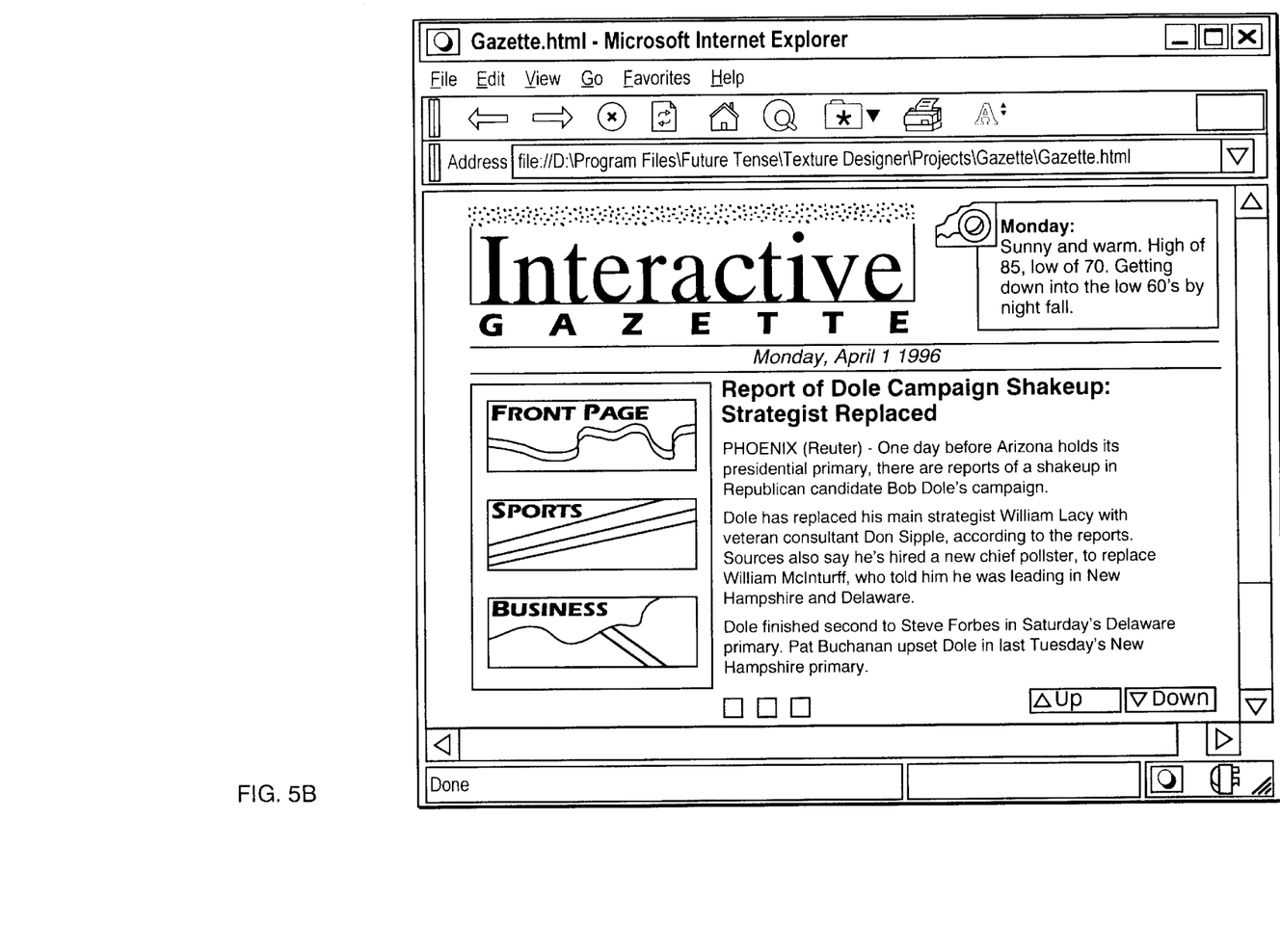

It is important to note that the Page Builder 100 may render text objects in alternate ways depending upon developer-selectable options. For example, in a first mode the Page Builder 100 creates all HTML pages as graphic objects with desired fonts, hyphenation, and other text attributes. One example of rendering a template 112, in this manner shown in FIG. 5A. In a second option for converting template files 112 it may not be desired to preserve fonts or other text or page formatting to save file space. In this option, an HTML file 320 is created having text embedded within which attempts to preserve as may as the fonts and text attributes as is supported in standard HTML file tag sets. As shown in FIG. 5B, all of the text specified to be displayed is attempted to be generated in a region 301 on a single page 320 per state of the layout. As such, the view of the other objects on the resulting HTML 320 page may not be faithful to the presentation in the Viewer-enabled browser 132. For example, the line length of the text content may differ.

Figure 5C:
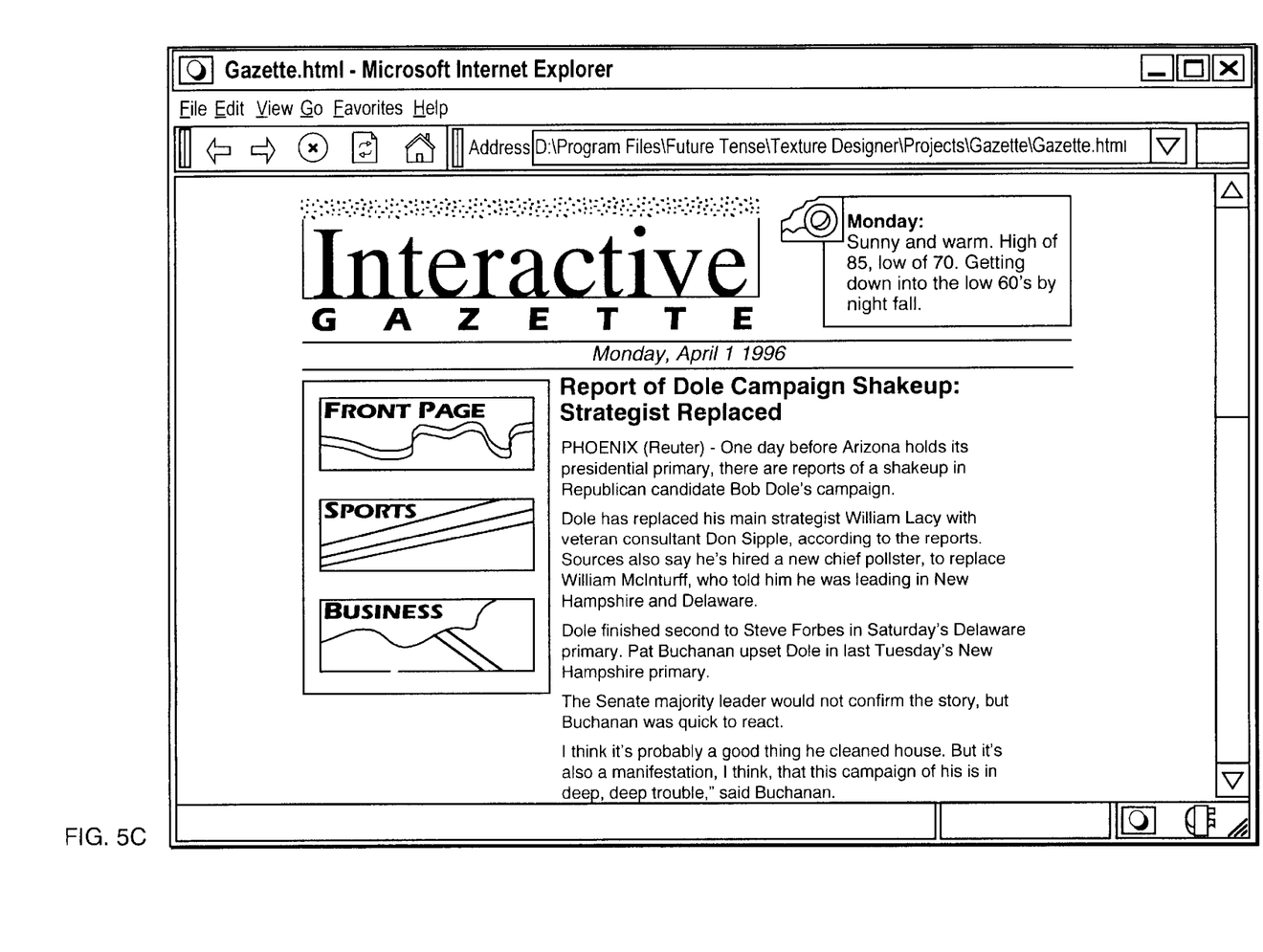

In a third option, as shown in FIG. 5C, the resulting HTML page 320 is resized to fit the content at the time the Page Builder 100 creates the HTML file 320. This, text may appear smaller than with the preserve formatting option FIG. 5A, and layout may not be preserved.

Figure 5D:
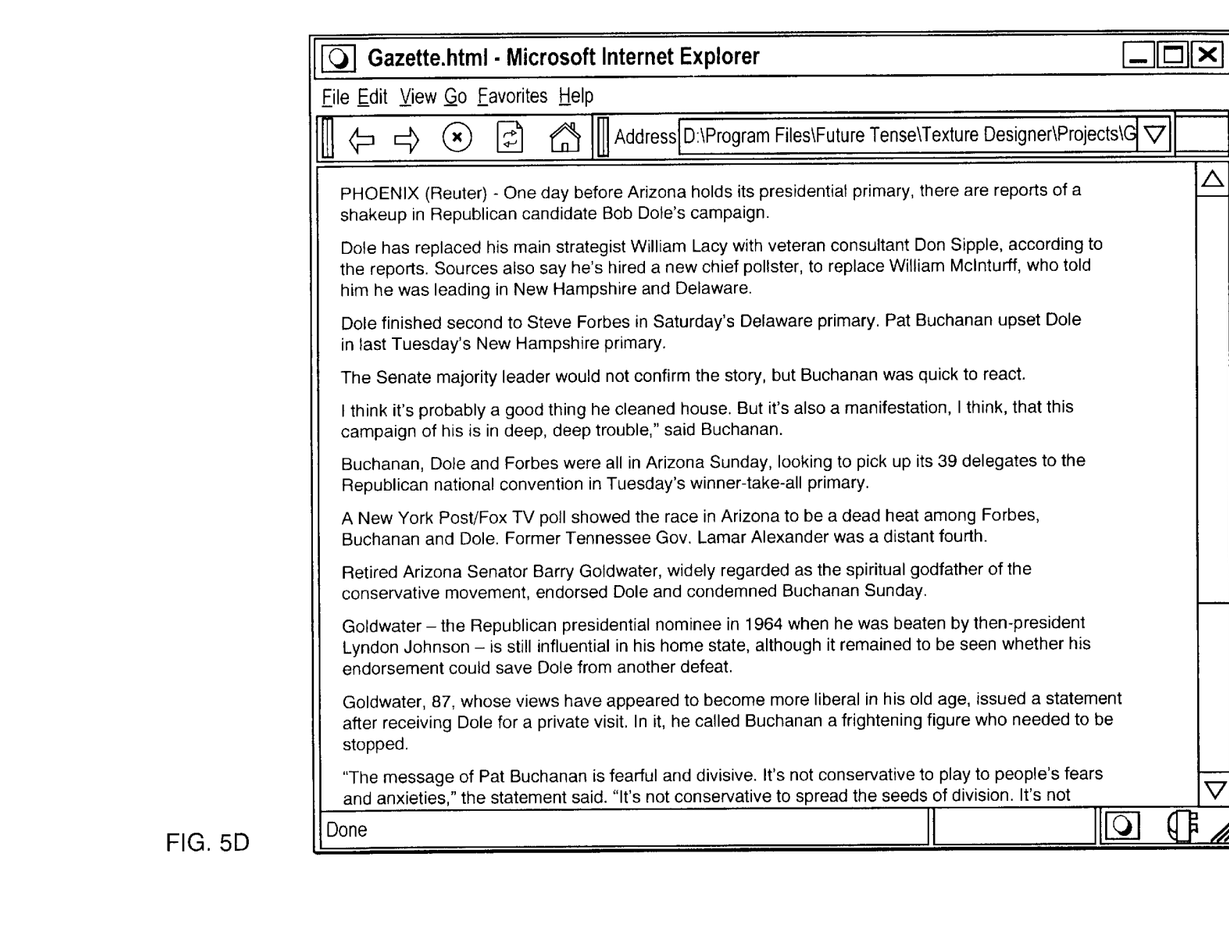

In a fourth option for handling text regions 301 on a page, the first generated page 320 may be the same as first page 320 described in connection with FIG. 5A, such that the HTML file 320 has a text region 301 which is generated as a graphic file having the correct fonts, hyphenation, and other text attributes as specified by the author. However, in this fourth option, overflow text subsequent to that which will fit on the the first page 320 is handled as an overflow situation by creating a second continuation page 321 in which HTML text files are created as defined in the second option. This situation is depicted in FIG. 5D.

Although the above discussion has been in connection with an implementation of the invention which operates within the context of the World Wide Web with HTML type Web pages, it should be understood that the invention can also be used in other types of information files and distributed computing environments. Therefore, while this invention has been particularly shown and described with reference to a preferred embodiment thereof, it will be understood by those skilled in the art that various changes in form and details may be made therein without departing from the spirit and scope of the invention as defined by the appended claims.

What is claimed is:

1. A system for displaying an electronic publication having a plurality of regions comprising:

a computer network;

a least one server computer system operationally coupled to the computer network, the server storing a dynamic content file containing a template file for the publication, the template containing instructions for creating visual representations of objects for the publication, the objects described by content information and actions to be taken on such objects, a first client computer system coupled to the computer network, the first client computer enabled to execute a viewer program in the context of a hypertext markup language browser program that accesses the at least one server computer, receives the template and the objects and actions specified therein, and renders the information in the template files for display within each region of the electronic publication;

a second client computer system coupled to the computer network, the second client computer system not being enabled to execute the viewer program, but the second client computer system executing a hypertext markup language browser program;

wherein the server computer additionally stores the output of a Page Builder program that operates on the template file to interpret the objects and actions specified therein, the output containing one or more stored visual representations for each navigable state of the template file; and wherein the visual representations stored for each navigable state of the template file are sent to the second client computer system to enable the second client computer system to view the objects and actions specified by the template without explicitly running the viewer program.

2. A system as in claim 1 wherein the content information in the template contains reference information indicating where the content information is stored.

3. A system as in claim 1 wherein the template file specifies regions of the publication which contain references to content files that contain one of text, images, or other data types.

4. A system as in claim 3 wherein the Page Builder program operates on text formatting commands specified by the content file to produce a visual representation in the form of graphic image format (GIF) file that represents a text page having layout and typography as originally specified by the template file, for each navigable state of the template file.

5. A system as in claim 3 wherein the Page Builder program operates on text formatting commands specified by the content file to produce a plurality of visual representation files each containing at least one graphic image format (GIF) file as well as hypertext links to permit navigation between the visual representation files.

6. A system as in claim 5 wherein the Page Builder program creates additional visual representation for each possible scrolled state of the display of the text as specified by the dynamic content publication file.

7. A system as in claim 1 wherein the Page Builder program creates a hyper text markup language file for each possible state of the electronic publication specified by the template file.

8. A system as in claim 1 wherein the Page Builder program runs on the server computer.

9. A system as in claim 1 wherein the Page Builder program generates the hypertext markup language files after a user of the second client computer system requests access to the dynamic content publication file.

10. A system as in claim 1 wherein the Page Builder program generates the hypertext markup language files prior to when a user of the second client computer system requests access to the dynamic content publication file.

11. In a computer system, a method of interpreting an electronic publication template file, the template file containing specifications for visible objects in the electronic publications, the object specifications comprising content information and object action information, the method comprising of:

a. automatically determining multiple possible interactions between visible object content in accordence with the actions specified by the template;

b. producing a plurality of visual state representations corresponding to the snapshots of multiple possible combinations of content and interaction between visible objects;

c. producing a visual representation file for each such visual state representation; and     d. incorporating transition action information in the visual representation files.

12. A method as in claim 11 additionally comprising the step of:

a. fetching content information from computer network remote sources.

13. A method as in claim 11 additionally comprising the step of:

f. selectively producing, in the visual representation file, a representation of text objects as images or as formatted text in accordance with user parameters.

14. A method for displaying an electronic publication in a distributed computing environment comprising the steps of:

at a server computer,

(a) storing a first Hypertext Markup Language (HTML) page file, the first HTML page file containing an applet tag, the applet tag including a first Uniform Resource Locator (URL) for a viewer program file, and a second URL for a publication file containing formatting instructions for at least one region in the electronic publication, and the publication file itself containing at least a third URL for a content file containing content information for the at least one region;

(b) storing a second set of HTML page files, the second set of HTML page files representing the output of a page builder program that operates on the publication file to interpret objects and actions specified therein, the second set of HTML page files containing one or more stored visual representations for navigable states of the publication file; and         (c) providing the first HTML page file and second set of HTML page files to one or more client computers upon request by that client computer;

at a first client computer,

(d) requesting the server computer to download the HTML page file;

(e) reading the applet tag contained in the HTML page file to determine the location of the viewer program file and then downloading the viewer program file as needed; and         (f) executing the viewer program file to perform the steps of             (i) downloading the publication file specified by the second URL;

(ii) obtaining content information by downloading the content file specified by the third URL;

(iii) formatting and displaying the content information so obtained from the content file according to the formatting instructions obtained from the publication file     at a second client computer,         (g) requesting the server computer to download the first HTML page file;

(h) reading one or more of the second set of HTML page files from the server computer in response to the request to download the first HTML page file; and         (i) displaying one or more of the HTML page files in the second set of HTML page files in accordance with navigable states of the template file to enable the second client computer system to view the objects and actions specified by the template file without explicitly running the viewer program file.

* * * * *